US012681947B2

(12) United States Patent
Chaudhuri et al.

(10) Patent No.: US 12,681,947 B2
(45) Date of Patent: Jul. 14, 2026

(54) GENERATING A VIEW OF A DATASET IN A DATA LAKEHOUSE BASED ON USER INTENT

(71) Applicant: International Business Machines Corporation, Armonk, NY (US)

(72) Inventors: Ritwik Chaudhuri, Bangalore (IN); Balaji Ganesan, Bengaluru (IN); Harsh Chauhan, Moradabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/754,937

(22) Filed: Jun. 26, 2024

(65) Prior Publication Data

US 2026/0003882 A1      Jan. 1, 2026

(51) Int. Cl.
*G06F 16/20* (2019.01)
*G06F 16/25* (2019.01)

(52) U.S. Cl.
CPC .................................. *G06F 16/254* (2019.01)

(58) Field of Classification Search
CPC .................................................. G06F 16/2379
USPC ............... 707/602, 749, 603, 718, 726, 731
See application file for complete search history.

(56) References Cited

U.S. PATENT DOCUMENTS

| | | | | |
|---|---|---|---|---|
| 6,922,700 | B1 * | 7/2005 | Aggarwal | G06F 16/2228 707/999.102 |
| 7,917,517 | B2 * | 3/2011 | Aggarwal | G06F 16/3331 707/742 |
| 10,706,045 | B1 | 7/2020 | Hasija et al. | |
| 11,182,437 | B2 * | 11/2021 | Yoshida | G06F 16/93 |
| 11,650,987 | B2 * | 5/2023 | Bordawekar | G06F 16/212 707/769 |
| 11,880,405 | B2 * | 1/2024 | Bodziony | G06F 16/583 |
| 11,928,107 | B2 * | 3/2024 | Mostafa | G06F 16/2458 |
| 2015/0286709 | A1 | 10/2015 | Sathish et al. | |
| 2019/0129952 | A1 * | 5/2019 | Yoshida | G06F 16/24578 |
| 2019/0258682 | A1 * | 8/2019 | Yoshida | G06F 16/24578 |

(Continued)

FOREIGN PATENT DOCUMENTS

| | | |
|---|---|---|
| CN | 114153850 A | 3/2022 |
| WO | WO2019082068 * | 5/2019 |

OTHER PUBLICATIONS

Behm et al., "Photon: A Fast Query Engine for Lakehouse Systems"; SIGMOD, 2022.*

(Continued)

*Primary Examiner* — Daniel A Kuddus
(74) *Attorney, Agent, or Firm* — Robert D. Bean

(57)          ABSTRACT

Described are techniques for generating a query based view of appropriate datasets in a data lakehouse. A query for data contained in the data lakehouse is received. A similarity between the query and a description of each table in the lakehouse is computed. Any description of a table with a similarity to the query that is greater than a threshold value results in the table potentially being included in a view. As a result, such a table is selected. A subset of the selected tables is then identified and joined to create a new view of a dataset. After generating a description of the new view based on headers and values of the dataset, a similarity between the query and the description of the new view is computed. If the similarity measure exceeds a threshold value, then the newly constructed view is displayed to the user.

20 Claims, 6 Drawing Sheets

(56)                References Cited

U.S. PATENT DOCUMENTS

| | | | |
|---|---|---|---|
| 2020/0210431 A1* | 7/2020 | Bordawekar | G06F 16/212 |
| 2021/0357406 A1* | 11/2021 | Potharaju | G06F 16/2471 |
| 2021/0365443 A1* | 11/2021 | Mostafa | G06F 16/24578 |
| 2022/0188567 A1 | 6/2022 | Ganesan et al. | |
| 2022/0300549 A1* | 9/2022 | Bodziony | G06F 16/583 |
| 2023/0075744 A1* | 3/2023 | Raschke | G03F 1/66 |
| 2023/0113635 A1* | 4/2023 | Borhade | G06F 16/215 |
| | | | 707/692 |
| 2023/0161934 A1 | 5/2023 | Ganesan et al. | |
| 2024/0046318 A1* | 2/2024 | Muriqi | G06Q 30/0277 |
| 2024/0320223 A1* | 9/2024 | Feng | G06F 16/2456 |

OTHER PUBLICATIONS

Aaron Blom, "Analyzing Enterprise Data with ChatGPT and Microsoft Fabric," Medium.com, https://medium.com/@ablom08/analyzing-enterprise-data-with-chat-gpt-and-microsoft-fabric-ce747931fcf2, Nov. 23, 2023, pp. 1-14.
Databricks, "Databricks Announces LakehouseIQ, the Natural Language Interface that Opens Data Analytics to Everyone," Databricks, https://www.databricks.com/company/newsroom/press-releases/databricks-announces-lakehouseiq-natural-language-interface-opens, Jun. 28, 2023, pp. 1-6.
Kumar et al., "Document Structure Aware Relation Extraction for Semantic Automation," CODS-COMAD 2024, Jan. 2024, pp. 232-236.
Shalghar et al., "Document Structure Aware Relational Graph Convolutional Networks for Ontology Population," arXiv:2104.12950v2, Apr. 13, 2022, pp. 1-9.
Anonymous, "Graph-based Method and System for Querying and Analyzing Enterprise Data Warehouses via Natural Language Interface," IP.com, IP.com No. IPCOM000227668D, May 10, 2013, pp. 1-9.
Marzocchi et al., "MammoTab: A Giant and Comprehensive Dataset for Semantic Table Interpretation," Proceedings of the Semantic Web Challenge on Tabular Data to Knowledge Graph Matching, SemTab, 2022, pp. 1-6.
Schlichtkrull et al., "Modeling Relational Data with Graph Convolutional Networks," arXiv:1703.06103v4, Oct. 26, 2017, pp. 1-9.
Shen et al., "TaxoExpan: Self-Supervised Taxonomy Expansion with Position-Enhanced Graph Neural Network," arXiv:2001.09522v1, Jan. 26, 2020, pp. 1-12.
Benno Kruit, "bennokr/semtab2023-CQA," https://github.com/bennokr/semtab2023-CQA, 2023, pp. 1-2.
Mazurek et al., "Wikary: A Dataset of N-ary Wikipedia Tables Matched to Qualified Wikidata Statements," Semantic Web Challenge on Tabular Data to Knowledge Graph Matching, SemTab, 2023, pp. 1-8.
Felipe, Generative AI for SAP, Retrieved from: https://community.sap.com/t5/technology-blog-posts-by-members/generative-ai-for-sap-part-v-models-and-knowledge-graphs-kg/ba-p/13571688/, Sep. 26, 2023, 34 Pages.
Ganesan, et al., A System and Methods for Searching and Exploring Data Products by Popularity, U.S. Appl. No. 18/614,992, filed Mar. 25, 2024, 31 pages.
NEO4J, Using a Knowledge Graph to implement a DevOps RAG application, Retrieved from: https://blog.langchain.dev/using-a-knowledge-graph-to-implement-a-devops-rag-application/, Oct. 4, 2023, 17 pages.

* cited by examiner

FIG. 3

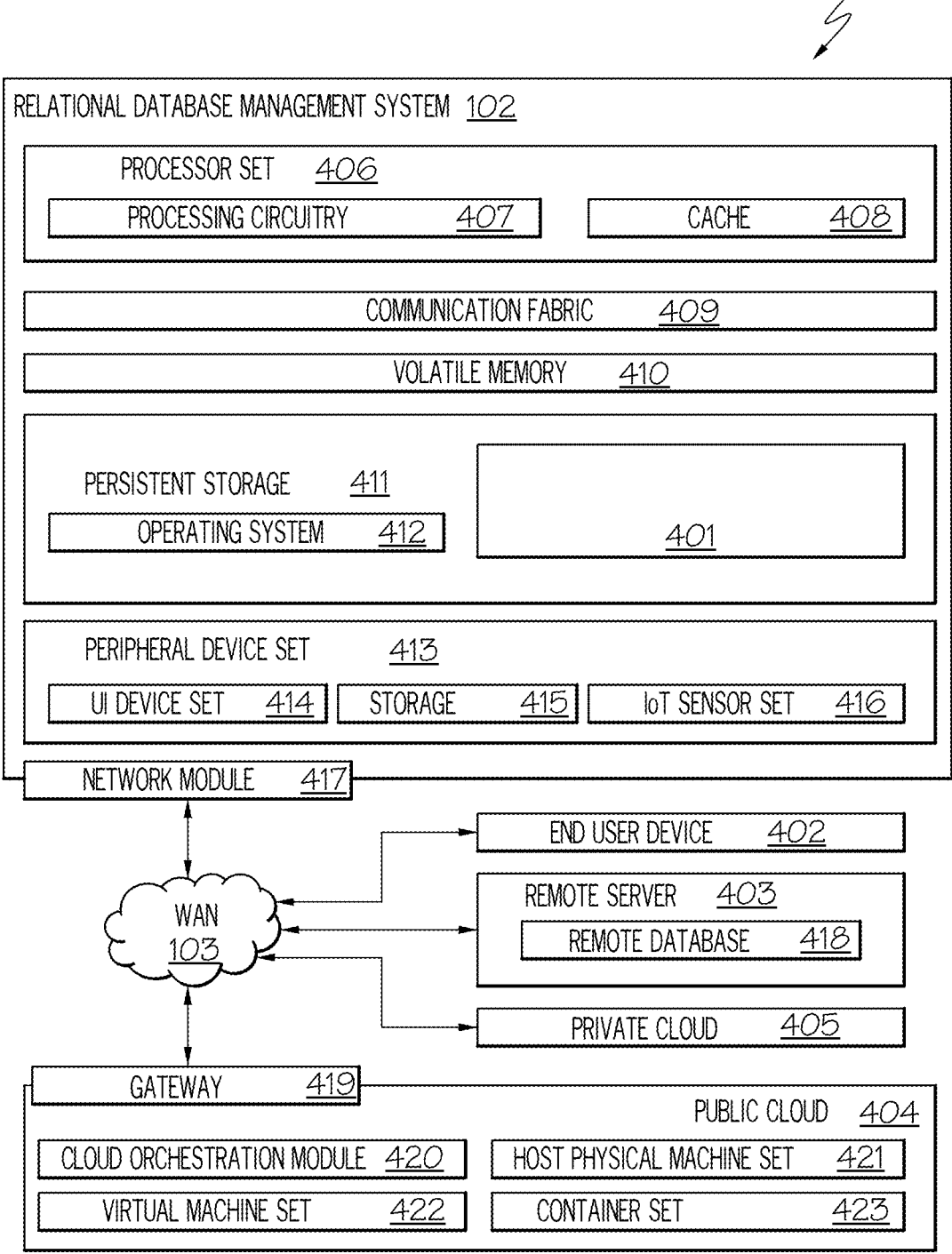

400

RELATIONAL DATABASE MANAGEMENT SYSTEM  102

PROCESSOR SET     406

PROCESSING CIRCUITRY          407          CACHE          408

COMMUNICATION FABRIC          409

VOLATILE MEMORY          410

PERSISTENT STORAGE          411

OPERATING SYSTEM          412

401

PERIPHERAL DEVICE SET          413

UI DEVICE SET          414     STORAGE          415     IoT SENSOR SET          416

NETWORK MODULE          417

WAN
103

END USER DEVICE          402

REMOTE SERVER          403

REMOTE DATABASE          418

PRIVATE CLOUD          405

GATEWAY          419

PUBLIC CLOUD          404

CLOUD ORCHESTRATION MODULE          420     HOST PHYSICAL MACHINE SET          421

VIRTUAL MACHINE SET          422     CONTAINER SET          423

FIG. 4

GENERATING A VIEW OF A DATASET IN A DATA LAKEHOUSE BASED ON USER INTENT

TECHNICAL FIELD

The present disclosure relates generally to a data lakehouse.

BACKGROUND

A data lakehouse is a modern data platform built from a combination of a data lake and a data warehouse. More specifically, a data lakehouse takes the flexible storage of structured data from a data lake and the management features and tools from data warehouses, then strategically implements them together as a larger system.

A data warehouse gathers raw data from multiple sources into a central repository and organizes it into a relational database infrastructure. This data management system primarily supports data analytics and business intelligence applications, such as enterprise reporting. The system uses ETL (extract, transform, and load) processes to extract, transform, and load data to its destination.

Data lakes are commonly built on big data platforms, such as Apache® Hadoop®. They are known for their low cost and storage flexibility as they lack the predefined schemas of traditional data warehouses. They also house different types of data, such as audio, video, and text. Since data producers largely generate unstructured data, this is an important distinction as this also enables more data science and artificial intelligence (AI) projects, which in turn drives more novel insights and better decision-making across an organization. However, data lakes are not without their own set of challenges. The size and complexity of data lakes can require more technical resources, such as data scientists and data engineers, to navigate the amount of data that it stores. Additionally, since data governance is implemented more downstream in these systems, data lakes tend to be more prone to more data silos, which can subsequently evolve into a data swamp. When this happens, the data lake can be unusable.

Data lakes and data warehouses are typically used in tandem. Data lakes act as a catch-all system for new data, and data warehouses apply downstream structure to specific data from this system. However, coordinating these systems to provide reliable data can be costly in both time and resources. Long processing times contribute to data staleness and additional layers of ETL introduce more risk to data quality.

The data lakehouse optimizes for the flaws within data warehouses and data lakes to form a better data management system. It provides organizations with fast, low-cost storage for their enterprise data while also delivering enough flexibility to support both data analytics and machine learning workloads.

Within a data lakehouse, however, there are diverse datasets making it difficult for the user to be provided with a view of the data sought by the user. That is, it is not possible for the user to access the right dataset within the data lakehouse, including multiple datasets joined tougher to form a dataset which can be used for the required purpose by the user.

SUMMARY

In one embodiment of the present disclosure, a computer-implemented method for generating a query based view of appropriate datasets in a data lakehouse comprises receiving a query for data contained in the data lakehouse. The method further comprises computing a similarity between the query and a description of each table in the data lakehouse. The method additionally comprises selecting one or more tables in the data lakehouse in response to the similarity between the query and the description of the one or more tables exceeding a first threshold value. Furthermore, the method comprises joining a subset of the selected one or more tables to create a new view of a dataset. Additionally, the method comprises generating a description of the new view of the dataset. In addition, the method comprises computing a similarity between the query and the description of the new view of the dataset. The method further comprises displaying the new view of the dataset to a user in response to the similarity between the query and the description of the new view of the dataset exceeding a second threshold value.

Additionally, in one embodiment of the present disclosure, the method further comprises creating an embedding from the query. Furthermore, the method comprises creating an embedding for a description of a table for each table in the data lakehouse. Additionally, the method comprises computing a similarity between the query and the description of the table for each table in the data lakehouse using the embedding from the query and the embedding for the description of the table for each table in the data lakehouse.

Furthermore, in one embodiment of the present disclosure, the similarity between the query and the descriptions of the tables in the data lakehouse is computed using semantic annotations of the tables in the data lakehouse.

Additionally, in one embodiment of the present disclosure, the method further comprises identifying the subset of the selected one or more tables using a relational graph convolutional network for linking keywords in the query to columns in the selected one or more tables of the data lakehouse.

Furthermore, in one embodiment of the present disclosure, the method additionally comprises selecting a class of tables within the selected one or more tables in the data lakehouse with a similarity greater than a third threshold value.

Additionally, in one embodiment of the present disclosure, the method further comprises identifying the subset of the selected one or more tables based on headers containing keywords or related keywords in the query.

Furthermore, in one embodiment of the present disclosure, the method additionally comprises generating the description of the new view of the dataset based on headers and values of the dataset.

Other forms of the embodiments of the method described above are in a system and in a computer program product.

Accordingly, embodiments of the present disclosure provide an appropriate view of the datasets in the data lakehouse to the user for the required purpose of the user.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 3 illustrates dynamically annotating tabular data using relational graph convolutional networks in accordance with an embodiment of the present disclosure;

FIG. 4 illustrates an embodiment of the present disclosure of the hardware configuration of the relational database management system which is representative of a hardware environment for practicing the present disclosure;

DETAILED DESCRIPTION

Figure 1:
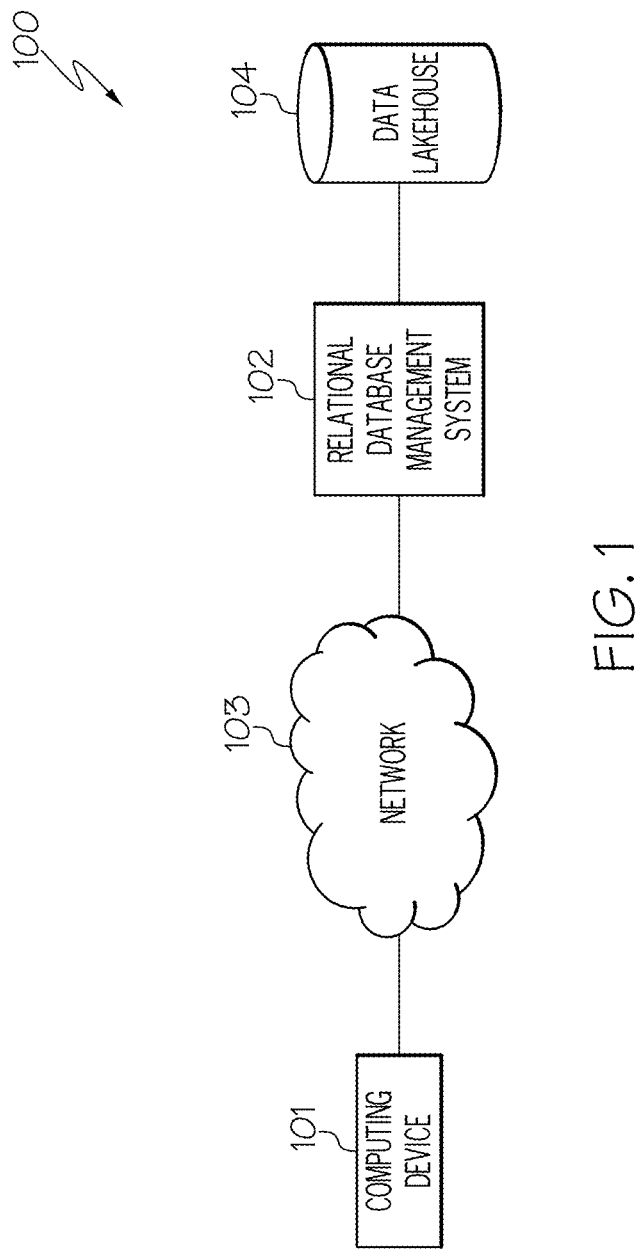
FIG. 1 illustrates an embodiment of the present disclosure of a communication system for practicing the principles of the present disclosure.

In one embodiment of the present disclosure, a computer-implemented method for generating a query based view of appropriate datasets in a data lakehouse comprises receiving a query for data contained in the data lakehouse. The method further comprises computing a similarity between the query and a description of each table in the data lakehouse. The method additionally comprises selecting one or more tables in the data lakehouse in response to the similarity between the query and the description of the one or more tables exceeding a first threshold value. Furthermore, the method comprises joining a subset of the selected one or more tables to create a new view of a dataset. Additionally, the method comprises generating a description of the new view of the dataset. In addition, the method comprises computing a similarity between the query and the description of the new view of the dataset. The method further comprises displaying the new view of the dataset to a user in response to the similarity between the query and the description of the new view of the dataset exceeding a second threshold value.

In this manner, an appropriate view of the datasets in the data lakehouse is provided to the user for the required purpose of the user.

Additionally, in one embodiment of the present disclosure, the method further comprises creating an embedding from the query. Furthermore, the method comprises creating an embedding for a description of a table for each table in the data lakehouse. Additionally, the method comprises computing a similarity between the query and the description of the table for each table in the data lakehouse using the embedding from the query and the embedding for the description of the table for each table in the data lakehouse.

In this manner, the similarity between the query and the table descriptions can be performed.

Furthermore, in one embodiment of the present disclosure, the similarity between the query and the descriptions of the tables in the data lakehouse is computed using semantic annotations (e.g., column to concept mapping, table and column description generation, etc.) of the tables in the data lakehouse.

In this manner, the similarity between the query and the table descriptions can be performed.

Additionally, in one embodiment of the present disclosure, the method further comprises identifying the subset of the selected one or more tables using a relational graph convolutional network for linking keywords in the query to columns in the selected one or more tables of the data lakehouse.

In this manner, tabular data can be dynamically annotated using a relational graph convolutional network.

Furthermore, in one embodiment of the present disclosure, the method additionally comprises selecting a class of tables within the selected one or more tables in the data lakehouse with a similarity greater than a third threshold value.

In this manner, a decision as to which class of tables should be chosen as a potential class of tables to be displayed to the user can be determined when there are multiple classes of tables.

Additionally, in one embodiment of the present disclosure, the method further comprises identifying the subset of the selected one or more tables based on headers containing keywords or related keywords in the query.

In this manner, the selected tables can be pruned to create a view of a dataset to be displayed to the user that is more tailored to the required purpose of the user.

Furthermore, in one embodiment of the present disclosure, the method additionally comprises generating the description of the new view of the dataset based on headers and values of the dataset.

In this manner, the similarity between the query and the constructed new view of the dataset can be computed.

Other forms of the embodiments of the method described above are in a system and in a computer program product.

As stated above, a data lakehouse is a modern data platform built from a combination of a data lake and a data warehouse. More specifically, a data lakehouse takes the flexible storage of structured data from a data lake and the management features and tools from data warehouses, then strategically implements them together as a larger system.

A data warehouse gathers raw data from multiple sources into a central repository and organizes it into a relational database infrastructure. This data management system primarily supports data analytics and business intelligence applications, such as enterprise reporting. The system uses ETL (extract, transform, and load) processes to extract, transform, and load data to its destination.

Data lakes are commonly built on big data platforms, such as Apache® Hadoop®. They are known for their low cost and storage flexibility as they lack the predefined schemas of traditional data warehouses. They also house different types of data, such as audio, video, and text. Since data producers largely generate unstructured data, this is an important distinction as this also enables more data science and artificial intelligence (AI) projects, which in turn drives more novel insights and better decision-making across an organization. However, data lakes are not without their own set of challenges. The size and complexity of data lakes can require more technical resources, such as data scientists and data engineers, to navigate the amount of data that it stores. Additionally, since data governance is implemented more downstream in these systems, data lakes tend to be more prone to more data silos, which can subsequently evolve into a data swamp. When this happens, the data lake can be unusable.

Data lakes and data warehouses are typically used in tandem. Data lakes act as a catch-all system for new data, and data warehouses apply downstream structure to specific data from this system. However, coordinating these systems to provide reliable data can be costly in both time and resources. Long processing times contribute to data staleness and additional layers of ETL introduce more risk to data quality.

The data lakehouse optimizes for the flaws within data warehouses and data lakes to form a better data management system. It provides organizations with fast, low-cost storage for their enterprise data while also delivering enough flexibility to support both data analytics and machine learning workloads.

Within a data lakehouse, there are diverse datasets making it difficult for the user to be provided with a view of the data sought by the user. That is, it is not possible for the user to access the right dataset within the data lakehouse, including multiple datasets joined tougher to form a dataset which can be used for the required purpose by the user.

The embodiments of the present disclosure provide a means for generating a view of an appropriate dataset in a data lakehouse to the user based on the intent of the user. In one embodiment, a query for data contained in the data lakehouse is received, which captures the intent of the user. The query is then matched against the tables in the data lakehouse. In one embodiment, such matching is performed based on embedding similarity with the semantic annotations (e.g., table description, column to concept mapping, column description, etc.). Any table description with a similarity to the query greater than a threshold value can potentially be included in a view to be generated. A "view," as used herein, refers to a virtual table. As a result, such a table is selected to form part of a class of tables. In one embodiment, such a class(es) of tables may be pruned into a subset of tables, such as based on the headers in the tables containing one or more keywords or related keywords in the query. In one embodiment, such tables from the subset of tables may be joined together to form a new view of a dataset, such as based on the primary and secondary keys. In one embodiment, a description of the new view of the dataset is generated based on the headers and values of the dataset. In one embodiment, such a description is generated using a large language model, where the headers and possible table data of the new view of the dataset are inputted into the model and a description of the new view of the dataset is outputted by the model. A similarity between the query and the generated description of the new view of the dataset is then computed. If the similarity exceeds a threshold value, then such a new view of the dataset is displayed to the user. In this manner, a view of an appropriate dataset in a data lakehouse is provided to the user. These and other features will be discussed in further detail below.

In some embodiments of the present disclosure, the present disclosure comprises a computer-implemented method, system, and computer program product for generating a query based view of appropriate datasets in a data lakehouse. In one embodiment of the present disclosure, a query for data contained in the data lakehouse is received. A similarity between the query and a description of each table in the lakehouse is computed. For example, such a similarity calculation is performed based on the similarity between the embedding from the query and the embeddings from the descriptions of the tables in the data lakehouse. Any description of a table with a similarity to the query that is greater than a threshold value results in the table potentially being included in a view to be generated. As a result, such a table is selected to form part of a class of tables. A subset of the selected tables is then identified and joined to create a new view of a dataset. In one embodiment, a subset of the selected tables is identified based on the headers containing the keywords or related keywords of the query. In one embodiment, such identified tables are then joined to create a new view of a dataset. After generating a description of the new view of the dataset based on headers and values of the dataset, such as via a large language model, a similarity between the query and the description of the new view of the dataset is computed. If the similarity measure exceeds a threshold value, then the newly constructed view of the dataset is displayed to the user. In this manner, an appropriate view of the datasets in the data lakehouse can be provided to the user for the required purpose of the user.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to a relational database management system 102 (e.g., structured query language (SQL) server) via a network 103. Furthermore, as illustrated in FIG. 1, relational database management system 102 is connected to a data lakehouse 104.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and relational database management system 102. It is noted that both computing device 101 and the user of computing device 101 may be identified with element number 101.

Network 103 may be, for example, a local area network, a wide area network, a wireless wide area network, a circuit-switched telephone network, a Global System for Mobile communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., SQL query) to relational database management system 102 (e.g., SQL server) to extract data from data lakehouse 104. Data lakehouse 104, as used herein, refers to a data platform built from a combination of a data lake and a data warehouse. More specifically, data lakehouse 104 takes the flexible storage of unstructured data from a data lake and the management features and tools from data warehouses, then strategically implements them together as a larger system. Relational database management system 102, as used herein, is configured to execute queries against data in data lakehouse 104 and provide answers for users, such as the user of computing device 101. Examples of relational database management system 102 can include, but are not limited to, MySQL®, IBM® Db2®, Microsoft Access®, SQLite®, Apache® Hive™, etc.

In one embodiment, the relational data of the tables of data lakehouse 104 may be located at various locations as opposed to a single location. Furthermore, the relational data of the tables of data lakehouse 104 may be stored in various formats, such as CSV, Apache® Parquet, JSON (JavaScript Object Notation), etc.

In one embodiment, relational database management system 102 is configured to generate a view of appropriate datasets in data lakehouse 104 to a user of computing device 101, such as based on user intent. A "view," as used herein, refers to a virtual table. "Appropriate datasets," as used herein, refer to the datasets which can be used for the required purpose by the user. In one embodiment, the intent of the user is captured from the query issued by the user (e.g., user of computing device 101). The query is then matched against the tables in data lakehouse 104. In one embodiment, such matching is performed based on embedding similarity with the semantic annotations (e.g., table description, column to concept mapping, column description, etc.). Any table description with a similarity to the query greater than a threshold value can potentially be included in a view to be generated. As a result, such a table is selected to form part of a class of tables.

In one embodiment, relational database management system 102 prunes such a class(es) of tables into a subset of tables, such as based on the headers in the tables containing one or more keywords or related keywords in the query. In one embodiment, such tables from the subset of tables may be joined together to form a new view of a dataset, such as based on the primary and secondary keys.

In one embodiment, relational database management system 102 generates a description of the new view of the dataset based on the headers and values of the dataset. Furthermore, in one embodiment, relational database management system 102 computes a similarity between the query and the generated description of the new view of the dataset. If the similarity exceeds a threshold value, then relational database management system 102 displays such a new view of the dataset to the user, such as via the display or user interface of computing device 101. In this manner, a view of an appropriate dataset in data lakehouse 104 is provided to the user (e.g., user of computing device 101).

A more detailed description of these and other features will be provided below. Furthermore, a description of the software components of relational database management system 102 is provided below in connection with FIG. 2 and a description of the hardware configuration of relational database management system 102 is provided further below in connection with FIG. 4.

System 100 is not to be limited in scope to any one particular network architecture. System 100 may include any number of computing devices 101, relational database management systems 102, networks 103, and data lakehouses 104.

A discussion regarding the software components used by relational database management system 102 to generate a view of appropriate datasets in data lakehouse 104 to a user (e.g., user of computing device 101) based on user intent is provided below in connection with FIG. 2.

Figure 2:
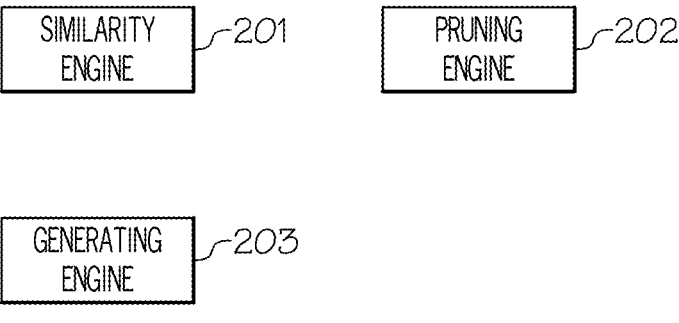
FIG. 2 is a diagram of the software components used by the relational database management system to generate a view of appropriate datasets in the data lakehouse to a user based on user intent in accordance with an embodiment of the present disclosure.

FIG. 2 is a diagram of the software components used by relational database management system 102 to generate a view of appropriate datasets in data lakehouse 104 to a user (e.g., user of computing device 101) based on user intent in accordance with an embodiment of the present disclosure.

Referring to FIG. 2, in conjunction with FIG. 1, relational database management system 102 includes similarity engine 201 configured to calculate the similarity between the query and the description of each table in data lakehouse 104.

In one embodiment, relational database management system 102 receives a query for data contained in data lakehouse 104, such as from the user of computing device 101, which captures the intent of the user. For example, the user's query may be directed to whether BMI (body mass index) affects the prevalence of heart diseases in humans. The intent of the user would then correspond to obtaining insights as to whether an individual's body mass index affects the prevalence of heart diseases in humans.

In one embodiment, similarity engine 201 matches the query against the tables in data lakehouse 104 in order to calculate the similarity between the query and the description of each table in data lakehouse 104. In one embodiment, such matching is performed based on embedding similarity with the semantic annotations (e.g., table description, column to concept mapping, column description, etc.).

In one embodiment, similarity engine 201 creates an embedding from the received query. An "embedding," as used herein, refers to a mathematical representation of objects, such as text in the query, in a low-dimensional vector space where the locations of those points in space are semantically meaningful, such as to machine learning (ML) algorithms.

In one embodiment, similarity engine 201 creates the embedding from the received query by vectorizing the text-based content of the query, such as via Word2vec, Doc2Vec, GloVe, etc.

In one embodiment, similarity engine 201 creates an embedding for the description of each table in data lakehouse 104. A "table," as used herein, refers to the arrangement of information or data, typically in rows and columns, or possibly in a more complex structure. In one embodiment, similarity engine 201 obtains a description of the tables in data lakehouse 104 based on the semantic annotations (e.g., table description, column to concept mapping, column description, etc.) of the tables in data lakehouse 104. A "semantic annotation" refers to the metadata that is attached to unstructured content, such as text documents, images, videos, etc., to describe relevant concepts. For example, such metadata can capture the meaning of a data element in a table and can be used by both humans and machines.

In one embodiment, the semantic annotations of the tables are made in batch mode using the metadata and, if possible, the data of the tables.

In one embodiment, such semantic annotations are obtained by similarity engine 201 via the use of commands, such as the DESCRIBE or DESC command, which may be used to show the structure of the table, such as column names, constraints on column names, etc.

In one embodiment, similarity engine 201 creates the embedding for the description of each table in data lakehouse 104 by vectorizing the semantic annotations (e.g., table description, column to concept mapping, column description, etc.) of the tables in data lakehouse 104, such as via Word2vec, Doc2Vec, GloVe, etc.

In one embodiment, similarity engine 201 computes the similarity between the query and the description of each table in data lakehouse 104 using the embeddings discussed above. For example, similarity engine 201 computes the similarity between the query and the description of each table in data lakehouse 104 using the embedding from the query and the embeddings for the descriptions of the tables in data lakehouse 104.

In one embodiment, similarity engine 201 computes such similarity by obtaining a similarity measure, such as cosine similarity, to determine the similarity between the embeddings. Such a similarity measure is compared to a threshold value, which may be user-designated, to determine if the table should be selected to form part of a class of tables, denoted as T. If the similarity measure exceeds such a threshold value, then the query and the associated table are deemed to be within a threshold degree of similarity and the table is selected to form part of a class of tables. Otherwise, the table is not selected to form part of a class of tables.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the query and the associated table are deemed to be within a threshold degree of similarity and the table is selected to form part of a class of tables. Otherwise, the table is not selected to form part of a class of tables.

In one embodiment, the similarity measure is a score between the values of 0 and 1 for vectors that have only positive values. In one embodiment, any negative scores can be made positive by taking its absolute value.

Similarity engine 201 utilizes various software tools for generating the similarity score, which can include, but are not limited to, TensorFlow®, Math Works®, plus sklearn, scikit-Learn® etc.

Relational database management system 102 further includes pruning engine 202 configured to prune these tables T into a subset of tables T'. "Pruning," as used herein, refers to removing unnecessary tables or columns of tables.

In the embodiment in which the tables T contain multiple classes of tables, pruning engine 202 selects a class of tables with a similarity greater than a threshold value, which may be user-designated. A "class," as used herein, defines the structure of the tables. Each class may consist of a collection of fields, aggregates, and methods.

In one embodiment, the similarity of a class of tables is computed by similarity engine 201 using the embeddings for the descriptions of the tables in the class of tables.

In one embodiment, similarity engine 201 computes such similarity by obtaining a similarity measure, such as cosine similarity, to determine the similarity between the embeddings. Such a similarity measure is compared to a threshold value, which may be user-designated, to determine if the class of tables should be selected by pruning engine 202. If the similarity measure exceeds such a threshold value, then the class of tables is selected by pruning engine 202. Otherwise, the class of tables is not selected by pruning engine 202.

In one embodiment, pruning engine 202 identifies a subset of tables T' from the chosen tables T, including the selected class of tables, based on headers of the tables containing keywords or related keywords in the query. Headers, as used herein, provide the type of information to be found in the columns of the table. For example, headers may include the column names of the table.

In one embodiment, pruning engine 202 identifies the subset of tables T' from the chosen tables T based on identifying the headers in tables T that contain all or some of the keywords in the user's query. A "keyword," as used herein, refers to a word or concept of great significance in understanding the user's intent in the query. For example, the user's query may be directed to whether BMI (body mass index) affects the prevalence of heart diseases in humans. In such a query, the words "BMI" and "heart disease" are the significant words in the query to understand the user's intent. In one embodiment, such keywords are identified from a data structure containing a listing of words that are deemed to be keywords. In one embodiment, such a data structure is populated by an expert. In one embodiment, such a data structure (e.g., table) resides within the storage device of relational database management system 102.

In one embodiment, pruning engine 202 analyzes such keywords to identify related keywords (e.g., cholesterol, blood pressure) which may also affect the prevalence of heart diseases. Those columns of tables of tables T that contain such related keywords, such as cholesterol, blood pressure, etc., are selected to form the subset of tables T' as discussed further below in connection with FIG. 3.

In one embodiment, such related keywords are identified from a data structure (e.g., table) that contains a listing of related keywords (e.g., cholesterol, blood pressure) to a particular term (e.g., heart disease) used in the user's query. For example, pruning engine 202 may perform a look-up in the data structure for any terms that are related to a term in the query (e.g., heart disease). Upon identifying the term in the query in the data structure, one or more related keywords are identified as being associated with such a term in the query. In one embodiment, such a data structure is populated by an expert. In one embodiment, such a data structure (e.g., table) resides within the storage device of relational database management system 102.

Upon identifying such keywords, including the keywords in the query and the related keywords, such keywords are linked with the columns of the tables (the columns of the selected tables of data lakehouse 104, including the selected class of tables of data lakehouse 104). That is, pruning engine 202 identifies the headers in tables T that contain all or some of the keywords or related keywords in the user's query by linking the keywords or related keywords in the user's query (and hence the intent of the user) with the columns of the tables (the columns of the selected tables of data lakehouse 104, including the selected class of tables of data lakehouse 104).

Such linking (referred to as dynamic annotation of columns) is performed using relational graph convolutional networks. A "relational graph convolutional network," as used herein, refers to a type of neural network used for analyzing datasets with complex relationships. In particular, the relational graph convolutional network (RGCN) is designed specifically for modeling relational data. Relational data refers to datasets where the relationships between data points are important, such as knowledge graphs. RGCNs use a graph's structure to learn hidden features about the relationships between nodes and edges, and then use these features to make predictions about the graph.

In one embodiment, RGCNs work by performing multiple rounds of convolution on the graph. In each round, RGCNs use the graph structure to aggregate information from neighboring nodes and edges. This information is then used to update the features of each node in the graph. The process is repeated for several rounds until the RGCN has learned all the relevant features of the graph.

RGCNs can also include a skip connection, which allows the network to preserve previously learned features. That is, the network can use information learned in previous rounds of convolution to improve its predictions in later rounds.

In one embodiment, pruning engine 202 utilizes RGCN to link the headers (e.g., column names) with the keywords or related keywords in the user's query.

In one embodiment, such keywords in a query, including the related keywords (e.g., cholesterol, blood pressure, etc.) are linked to columns (e.g., column names, such as height and weight for body mass index (BMI), APOB (apolipoprotein B-100 test which provides a risk for cardiovascular disease), LDL (low density lipoproteins, which is a type of cholesterol), and VLDL (very low density lipoproteins, which is a type of cholesterol)) of the tables of the selected tables of data lakehouse 104 (e.g., selected class of tables of data lakehouse 104) using the graph structure of the RGCN, which includes concept nodes (associated with keywords and related keywords used in the query), which are mapped to particular columns of the tables of data lakehouse 104. Those mapped columns form the subset of tables T', which includes a reduced number of columns in the tables that will be part of the generated view. A "view," as used herein, refers to a virtual table.

In one embodiment, such a graph structure of the RGCN corresponds to heterogeneous graphs, which offer a unified view of the multimodal data systems by defining multiple types of nodes (for each data type) and edges (for the relation between data items).

Figure 3:
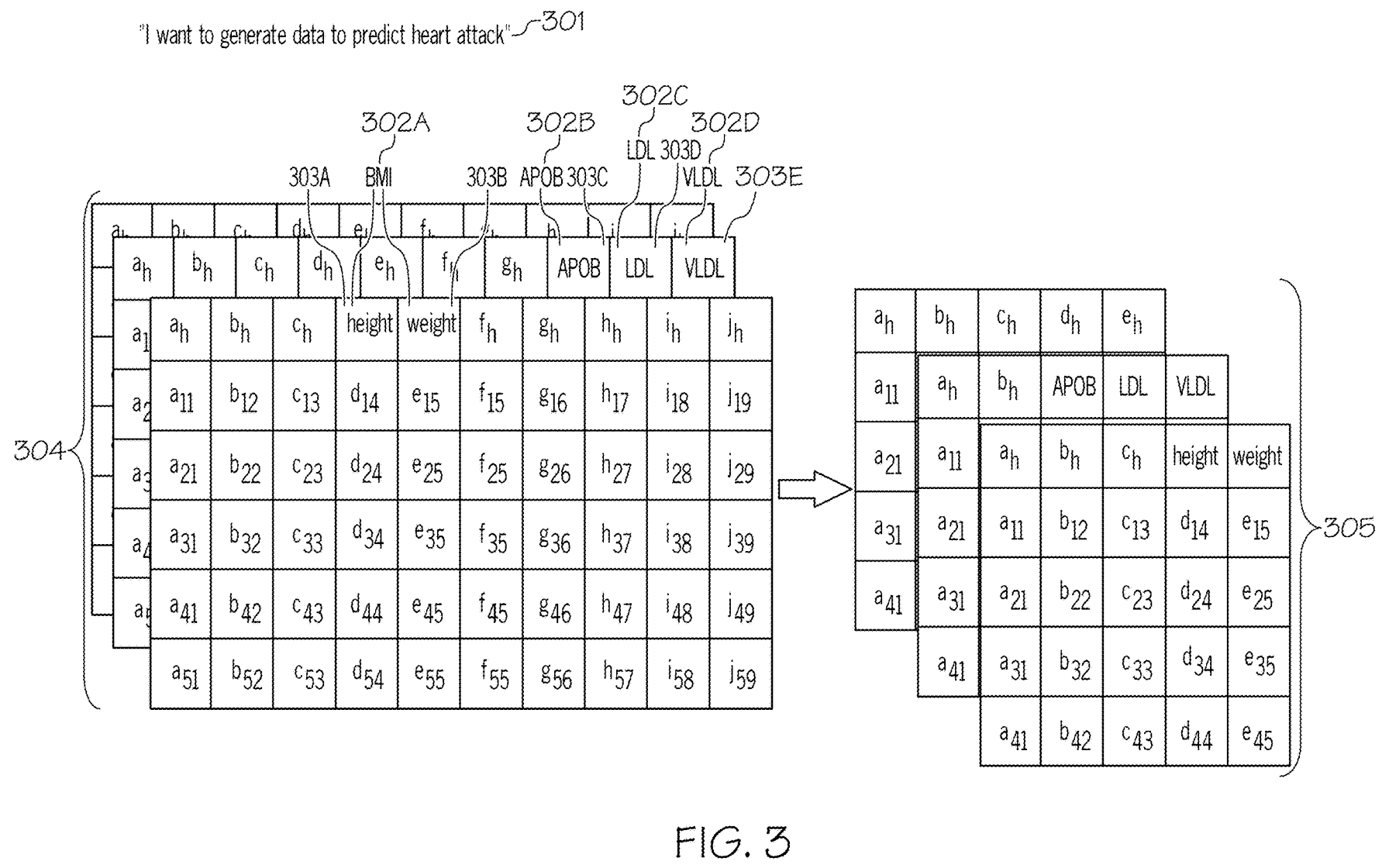

By utilizing the RGCN, a subset of tables T' of the selected tables T are identified based on headers containing the keywords or related keywords in the query as illustrated in FIG. 3.

FIG. 3 illustrates dynamically annotating tabular data using relational graph convolutional networks in accordance with an embodiment of the present disclosure.

Referring to FIG. 3, in the query 301 "I want to generate data to predict heart attack," the term "heart attack" may be identified as being a keyword. Such a keyword may be related to keywords, BMI 302A (body mass index), APOB 302B (apolipoprotein B-100 test which provides a risk for cardiovascular disease), LDL 302C (low density lipoproteins, which is a type of cholesterol), and VLDL 302D (very low density lipoproteins, which is a type of cholesterol) as identified from a data structure as discussed above. Such keywords and related keywords may be associated with concept nodes of the RGCN, which are mapped to particular columns (e.g., columns 303A-303E) of the selected tables T 304 of data lakehouse 104. Such mapped columns are used to identify the subset of tables T' 305 of the selected tables T 304 based on the headers containing the keywords or related keywords in the query.

Returning to FIG. 2, in conjunction with FIGS. 1 and 3, pruning engine 202 is further configured to join the identified subset of tables T' to create a new "view of a dataset" (may be simply referred to as a "view"). A "view of a dataset," as used herein, refers to a virtual table of a collection of data, such as formed from the joined identified subset of tables T'. In one embodiment, such a subset of tables T' are joined based on the primary and secondary keys. A primary key, as used herein, refers to a special relational database table column (or combination of columns) designated to uniquely identify each table record. A secondary key, as used herein, refers to a column or a set of columns in a table that uniquely identifies each row in a table that is not the primary key.

In one embodiment, if there are multiple classes of tables T', then pruning engine 202 selects the class of tables T' which gives rise to the largest sized joined tables.

Relational database management system 102 additionally includes generating engine 203 configured to generate a description of the new view of the dataset based on the headers and values of the dataset.

In one embodiment, generating engine 203 generates a description of the new view of the dataset based on the headers and values of the dataset using a fine-tuned/prefix-tuned large language model (LLM). A large language model (LLM), as used herein, is a type of artificial intelligence (AI) program that can perform a variety of natural language processing (NLP) tasks using machine learning and deep learning algorithms: recognize, translate, predict, generate, and summarize. Examples of such a LLM can include, but are not limited to, GPT-4®, and Granite®.

Large language model (LLM) fine-tuning is a way to enhance the performance of pretrained LLMs for specific tasks or domains with the aim of achieving improved inference quality with limited resources.

Prefix tuning is a method for training large language models (LLMs) for specific tasks, such as writing, by optimizing a small, task-specific part of the model called the prefix. It is a type of prompt tuning that involves adding a trainable module to each transformer layer of a pre-trained LLM. This module is made up of a sequence of continuous task-specific training vectors. Fine-tuning and prefix-tuning are both methods for adapting pre-trained language models (LLMs) to new tasks, such as outputting the description of the view of a dataset, such as the newly created view, based on the headers along with the cell values of the dataset. The "description of the view of the dataset," as used herein, refers to the structure of the dataset to be viewed by the user, such as the column names, constraints on the column names, etc. of the tables of the dataset.

In one embodiment, the input to the LLM corresponds to the headers along with the cell values; whereas, the output of the LLM is the description of the view of the dataset. That is, the headers and cell values are passed into the fine-tuned/prefix-tuned LLM which outputs the description of the view of the dataset.

In one embodiment, the LLM is trained using deep learning techniques. In one embodiment, the LLM is trained to output the description of the view of the dataset based on the headers and cell values of the dataset using a multi-faceted process that involves self-supervised learning, supervised learning, and reinforcement learning. The self-supervised learning phase helps the model to understand language and specific domains. Supervised learning enables the model to follow instructions and generalize to new tasks. Finally, reinforcement learning encourages desirable behaviors.

In one embodiment generating engine 203 trains the LLM to generate a description of the view of a dataset, such as the generated new view of the dataset, based on the header and values of the dataset using various software tools, which can include, but are not limited to, TensorFlow®, PyTorch®, NLTK, spaCy®, etc.

As discussed above, similarity engine 201 computes the similarity between the query and the description of each table in data lakehouse 104. Furthermore, in one embodiment, similarity engine 201 is configured to compute the similarity between the query and the description of the new view of the dataset.

In one embodiment, similarity engine 201 computes the similarity between the query and the description of the new view of the dataset by vectorizing the text-based content of the query and the description of the new view of the dataset to create embeddings, such as via Word2vec, Doc2Vec, GloVe, etc.

In one embodiment, similarity engine 201 computes the similarity between the query and the description of new view of the dataset by obtaining a similarity measure, such as cosine similarity, to determine the similarity between the embeddings of the query and the description of the new view of the dataset. Such a similarity measure is compared to a threshold value, which may be user-designated, to determine if the newly constructed view of the dataset should be displayed to the user.

If the similarity measure exceeds such a threshold value, then the newly constructed view of the dataset is displayed to the user, such as the user of computing device 101. In one embodiment, the newly constructed view of the dataset is displayed on the user interface of computing device 101.

If, however, the similarity measure does not exceeds such a threshold value, then a new view is constructed using other subsets of tables T'.

As discussed above, "cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the newly constructed view of the dataset is displayed to the user. Otherwise, a new view is constructed using other subsets of tables T'.

In one embodiment, the similarity measure is a score between the values of 0 and 1 for vectors that have only positive values. In one embodiment, any negative scores can be made positive by taking its absolute value.

Similarity engine 201 utilizes various software tools for generating the similarity score, which can include, but are not limited to, TensorFlow®, Math Works®, plus sklearn, scikit-Learn®, etc.

In this manner, an appropriate view of the datasets in the data lakehouse can be provided to the user for the required purpose of the user.

A further description of these and other features is provided below in connection with the discussion of the method for generating a view of appropriate datasets in a data lakehouse based on user intent.

Prior to the discussion of the method for generating a view of appropriate datasets in a data lakehouse based on user intent, a description of the hardware configuration of relational database management system 102 (FIG. 1) is provided below in connection with FIG. 4.

Referring now to FIG. 4, in conjunction with FIG. 1, FIG. 4 illustrates an embodiment of the present disclosure of the hardware configuration of relational database management system 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code (stored in block 401) involved in performing the inventive methods, such as generating a view of appropriate datasets in a data lakehouse based on the user intent. In addition to block 401, computing environment 400 includes, for example, relational database management system 102, network 103, such as a wide area network (WAN), end user device (EUD) 402, remote server 403, public cloud 404, and private cloud 405. In this embodiment, relational database management system 102 includes processor set 406 (including processing circuitry 407 and cache 408), communication fabric 409, volatile memory 410, persistent storage 411 (including operating system 412 and block 401, as identified above), peripheral device set 413 (including user interface (UI) device set 414, storage 415, and Internet of Things (IoT) sensor set 416), and network module 417. Remote server 403 includes remote database 418. Public cloud 404 includes gateway 419, cloud orchestration module 420, host physical machine set 421, virtual machine set 422, and container set 423.

Relational database management system 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 418. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically relational database management system 102, to keep the presentation as simple as possible. Relational database management system 102 may be located in a cloud, even though it is not shown in a cloud in FIG. 4. On the other hand, relational database management system 102 is not required to be in a cloud except to any extent as may be affirmatively indicated.

Processor set 406 includes one, or more, computer processors of any type now known or to be developed in the future. Processing circuitry 407 may be distributed over multiple packages, for example, multiple, coordinated integrated circuit chips. Processing circuitry 407 may implement multiple processor threads and/or multiple processor cores. Cache 408 is memory that is located in the processor chip package(s) and is typically used for data or code that should be available for rapid access by the threads or cores running on processor set 406. Cache memories are typically organized into multiple levels depending upon relative proximity to the processing circuitry. Alternatively, some, or all, of the cache for the processor set may be located "off chip." In some computing environments, processor set 406 may be designed for working with qubits and performing quantum computing.

Computer readable program instructions are typically loaded onto relational database management system 102 to cause a series of operational steps to be performed by processor set 406 of relational database management system 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 408 and the other storage media discussed below. The program instructions, and associated data, are accessed by processor set 406 to control and direct performance of the inventive methods. In computing environment 400, at least some of the instructions for performing the inventive methods may be stored in block 401 in persistent storage 411.

Communication fabric 409 is the signal conduction paths that allow the various components of relational database management system 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 410 is any type of volatile memory now known or to be developed in the future. Examples include dynamic type random access memory (RAM) or static type RAM. Typically, the volatile memory is characterized by random access, but this is not required unless affirmatively indicated. In relational database management system 102, the volatile memory 410 is located in a single package and is internal to relational database management system 102, but, alternatively or additionally, the volatile memory may be distributed over multiple packages and/or located externally with respect to relational database management system 102.

Persistent Storage 411 is any form of non-volatile storage for computers that is now known or to be developed in the future. The non-volatility of this storage means that the stored data is maintained regardless of whether power is being supplied to relational database management system 102 and/or directly to persistent storage 411. Persistent storage 411 may be a read only memory (ROM), but typically at least a portion of the persistent storage allows writing of data, deletion of data and re-writing of data. Some familiar forms of persistent storage include magnetic disks and solid state storage devices. Operating system 412 may take several forms, such as various known proprietary operating systems or open source Portable Operating System Interface type operating systems that employ a kernel. The code included in block 401 typically includes at least some of the computer code involved in performing the inventive methods.

Peripheral device set 413 includes the set of peripheral devices of relational database management system 102. Data communication connections between the peripheral devices and the other components of relational database management system 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 414 may include components such as a display screen, speaker, microphone, wearable devices (such as goggles and smart watches), keyboard, mouse, printer, touchpad, game controllers, and haptic devices. Storage 415 is external storage, such as an external hard drive, or insertable storage, such as an SD card. Storage 415 may be persistent and/or volatile. In some embodiments, storage 415 may take the form of a quantum computing storage device for storing data in the form of qubits. In embodiments where relational database management system 102 is required to have a large amount of storage (for example, where relational database management system 102 locally stores and manages a large database) then this storage may be provided by peripheral storage devices designed for storing very large amounts of data, such as a storage area network (SAN) that is shared by multiple, geographically distributed computers. IoT sensor set 416 is made up of sensors that can be used in Internet of Things applications. For example, one sensor may be a thermometer and another sensor may be a motion detector.

Network module 417 is the collection of computer software, hardware, and firmware that allows relational database management system 102 to communicate with other computers through WAN 103. Network module 417 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 417 are performed on the same physical hardware device. In other embodiments (for example, embodiments that utilize software-defined networking (SDN)), the control functions and the forwarding functions of network module 417 are performed on physically separate devices, such that the control functions manage several different network hardware devices. Computer readable program instructions for performing the inventive methods can typically be downloaded to relational database management system 102 from an external computer or external storage device through a network adapter card or network interface included in network module 417.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 402 is any computer system that is used and controlled by an end user (for example, a customer of an enterprise that operates relational database management system 102), and may take any of the forms discussed above in connection with relational database management system 102. EUD 402 typically receives helpful and useful data from the operations of relational database management system 102. For example, in a hypothetical case where relational database management system 102 is designed to provide a recommendation to an end user, this recommendation would typically be communicated from network module 417 of relational database management system 102 through WAN 103 to EUD 402. In this way, EUD 402 can display, or otherwise present, the recommendation to an end user. In some embodiments, EUD 402 may be a client device, such as thin client, heavy client, mainframe computer, desktop computer and so on.

Remote server 403 is any computer system that serves at least some data and/or functionality to relational database management system 102. Remote server 403 may be controlled and used by the same entity that operates relational database management system 102. Remote server 403 represents the machine(s) that collect and store helpful and useful data for use by other computers, such as relational database management system 102. For example, in a hypothetical case where relational database management system 102 is designed and programmed to provide a recommendation based on historical data, then this historical data may be provided to relational database management system 102 from remote database 418 of remote server 403.

Public cloud 404 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 404 is performed by the computer hardware and/or software of cloud orchestration module 420. The computing resources provided by public cloud 404 are typically implemented by virtual computing environments that run on various computers making up the computers of host physical machine set 421, which is the universe of physical computers in and/or available to public cloud 404. The virtual computing environments (VCEs) typically take the form of virtual machines from virtual machine set 422 and/or containers from container set 423. It is understood that these VCEs may be stored as images and may be transferred among and between the various physical machine hosts, either as images or after instantiation of the VCE. Cloud orchestration module 620 manages the transfer and storage of images, deploys new instantiations of VCEs and manages active instantiations of VCE deployments. Gateway 419 is the collection of computer software, hardware, and firmware that allows public cloud 404 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 405 is similar to public cloud 404, except that the computing resources are only available for use by a single enterprise. While private cloud 405 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 404 and private cloud 405 are both part of a larger hybrid cloud.

Block 401 further includes the software components discussed above in connection with FIGS. 2-3 to generate a view of appropriate datasets in a data lakehouse based on the user intent, In one embodiment, such components may be implemented in hardware. The functions discussed above performed by such components are not generic computer functions. As a result, relational database management system 102 is a particular machine that is the result of implementing specific, non-generic computer functions.

In one embodiment, the functionality of such software components of relational database management system 102, including the functionality for generating a view of appropriate datasets in a data lakehouse based on the user intent, may be embodied in an application specific integrated circuit.

As stated above, a data lakehouse is a modern data platform built from a combination of a data lake and a data warehouse. More specifically, a data lakehouse takes the flexible storage of structured data from a data lake and the management features and tools from data warehouses, then strategically implements them together as a larger system. The data lakehouse optimizes for the flaws within data warehouses and data lakes to form a better data management system. It provides organizations with fast, low-cost storage for their enterprise data while also delivering enough flexibility to support both data analytics and machine learning workloads. Within a data lakehouse, there are diverse datasets making it difficult for the user to be provided with a view of the data sought by the user. That is, it is not possible for the user to access the right dataset within the data lakehouse, including multiple datasets joined tougher to form a dataset which can be used for the required purpose by the user.

Figure 5:
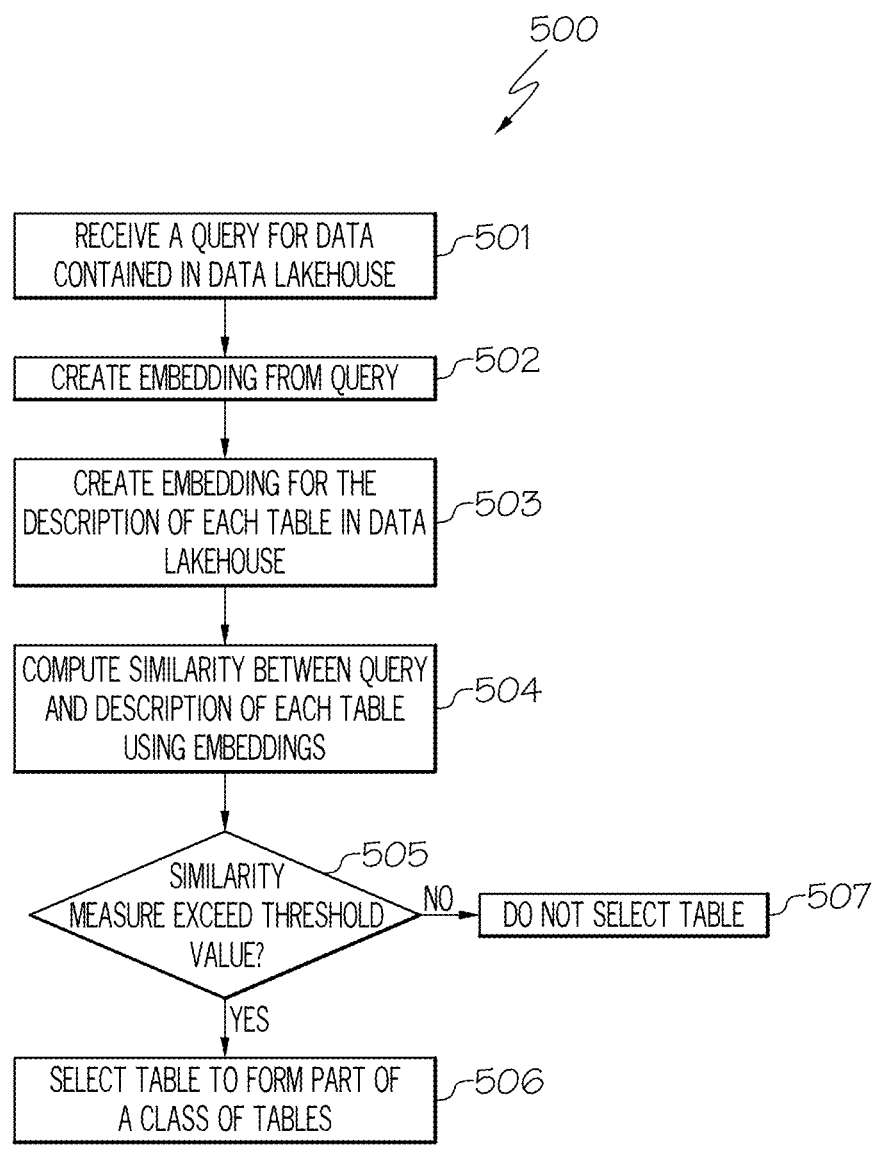
FIG. 5 is a flowchart of a method for selecting tables in a data lakehouse that match the query in accordance with an embodiment of the present disclosure.
Figure 6:
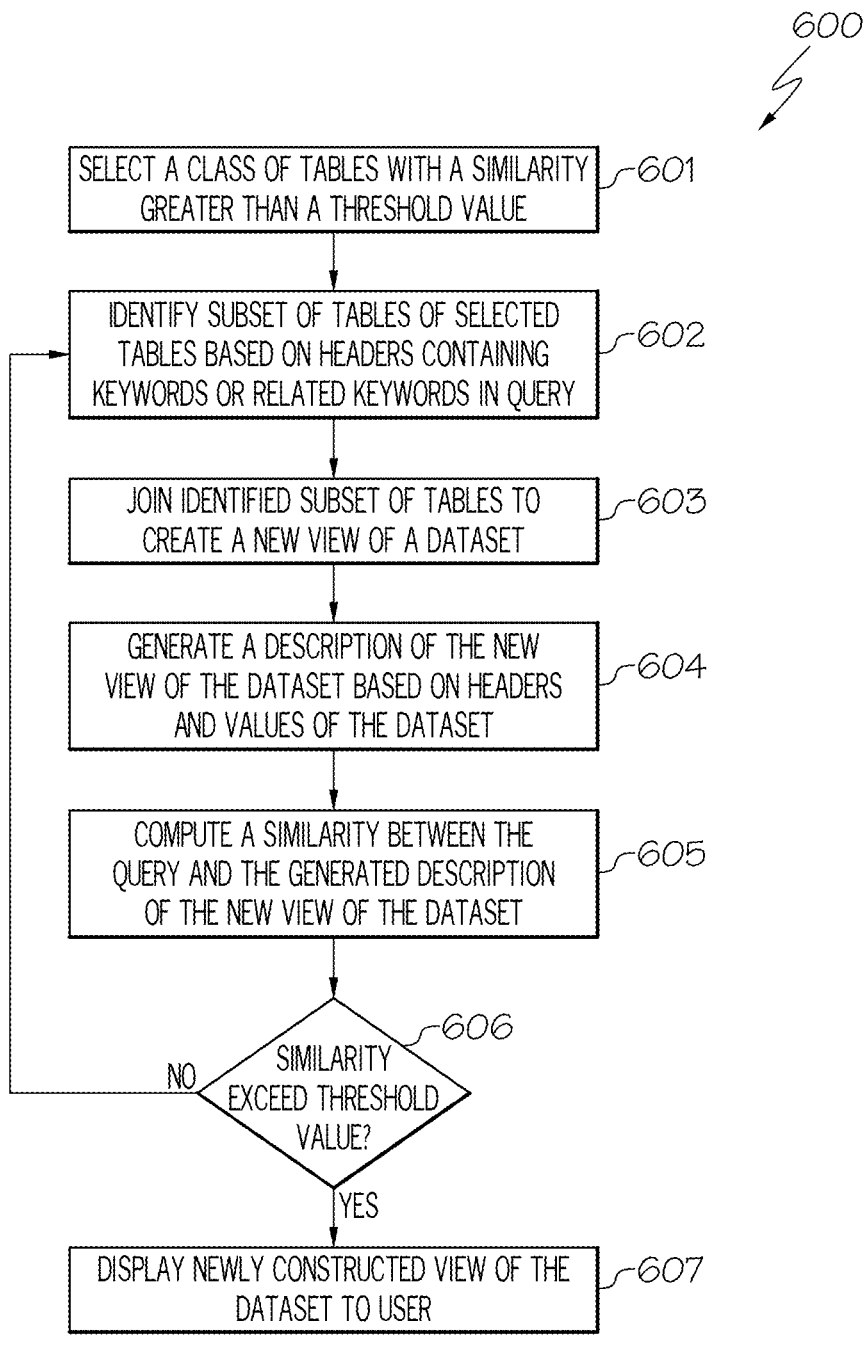
FIG. 6 is a flowchart of a method for generating a view of an appropriate dataset in a data lakehouse to the user based on the intent of the user in accordance with an embodiment of the present disclosure.

The embodiments of the present disclosure provide a means for generating a view of an appropriate dataset in a data lakehouse to the user based on the intent of the user as discussed below in connection with FIGS. 5-6. FIG. 5 is a flowchart of a method for selecting tables in a data lakehouse that match the query. FIG. 6 is a flowchart of a method for generating a view of an appropriate dataset in a data lakehouse to the user based on the intent of the user.

As discussed above, FIG. 5 is a flowchart of a method 500 for selecting tables in a data lakehouse that match the query in accordance with an embodiment of the present disclosure.

Referring to FIG. 5, in conjunction with FIGS. 1-4, in operation 501, relational database management system 102 receives a query for data contained in data lakehouse 104, such as from the user of computing device 101.

As discussed above, in one embodiment, the query for data contained in data lakehouse 104 captures the intent of the user (e.g., user of computing device 101). For example, the user's query may be directed to whether BMI (body mass index) affects the prevalence of heart diseases in humans. The intent of the user would then correspond to obtaining insights as to whether an individual's body mass index affects the prevalence of heart diseases in humans.

In operation 502, similarity engine 201 of relational database management system 102 creates an embedding from the query.

As stated above, in one embodiment, similarity engine 201 matches the query against the tables in data lakehouse 104 in order to calculate the similarity between the query and the description of each table in data lakehouse 104. In one embodiment, such matching is performed based on embedding similarity with the semantic annotations (e.g., table description, column to concept mapping, column description, etc.).

In one embodiment, similarity engine 201 creates an embedding from the received query. An "embedding," as used herein, refers to a mathematical representation of objects, such as text in the query, in a low-dimensional vector space where the locations of those points in space are semantically meaningful, such as to machine learning (ML) algorithms.

In one embodiment, similarity engine 201 creates the embedding from the received query by vectorizing the text-based content of the query, such as via Word2vec, Doc2Vec, GloVe, etc.

In operation 503, similarity engine 201 of relational database management system 102 creates an embedding for the description of each table in data lakehouse 104.

As discussed above, a "table," as used herein, refers to the arrangement of information or data, typically in rows and columns, or possibly in a more complex structure. In one embodiment, similarity engine 201 obtains a description of the tables in data lakehouse 104 based on the semantic annotations (e.g., table description, column to concept mapping, column description, etc.) of the tables in data lakehouse 104. A "semantic annotation" refers to the metadata that is attached to unstructured content, such as text documents, images, videos, etc., to describe relevant concepts. For example, such metadata can capture the meaning of a data element in a table and can be used by both humans and machines.

In one embodiment, the semantic annotations of the tables are made in batch mode using the metadata and, if possible, the data of the tables.

In one embodiment, such semantic annotations are obtained by similarity engine 201 via the use of commands, such as the DESCRIBE or DESC command, which may be used to show the structure of the table, such as column names, constraints on column names, etc.

In one embodiment, similarity engine 201 creates the embedding for the description of each table in data lakehouse 104 by vectorizing the semantic annotations (e.g., table description, column to concept mapping, column description, etc.) of the tables in data lakehouse 104, such as via Word2vec, Doc2Vec, GloVe, etc.

In operation 504, similarity engine 201 of relational database management system 102 computes the similarity between the query and the description of each table in data lakehouse 104 using the embeddings discussed above. For example, similarity engine 201 computes the similarity between the query and the description of each table in data lakehouse 104 using the embedding from the query and the embeddings for the descriptions of the tables in data lakehouse 104.

As stated above, in one embodiment, similarity engine 201 computes such similarity by obtaining a similarity measure, such as cosine similarity, to determine the similarity between the embeddings.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the query and the associated table are deemed to be within a threshold degree of similarity and the table is selected to form part of a class of tables. Otherwise, the table is not selected to form part of a class of tables.

In one embodiment, the similarity measure is a score between the values of 0 and 1 for vectors that have only positive values. In one embodiment, any negative scores can be made positive by taking its absolute value.

Similarity engine 201 utilizes various software tools for generating the similarity score, which can include, but are not limited to, TensorFlow®, Math Works®, plus sklearn, scikit-Learn®, etc.

In operation 505, similarity engine 201 of relational database management system 102 determines if the similarity measure exceeds a threshold value, which may be user-designated.

If the similarity measure exceeds such a threshold value, then, in operation 506, similarity engine 201 of relational database management system 102 selects the table to form part of a class of tables since the query and the associated table are deemed to be within a threshold degree of similarity.

If, however, the similarity measure does not exceed such a threshold value, then, in operation 507, similarity engine 201 of relational database management system 102 does not select the table to form part of a class of tables.

Upon selecting tables of data lakehouse 104 to form part of a class of tables, such tables are pruned and joined to form a potential table to be displayed to the user as discussed below in connection with FIG. 6. "Pruning," as used herein, refers to removing unnecessary tables or columns of tables.

FIG. 6 is a flowchart of a method 600 for generating a view of an appropriate dataset in a data lakehouse to the user based on the intent of the user in accordance with an embodiment of the present disclosure. An "appropriate dataset," as used herein, refers to the dataset which can be used for the required purpose by the user.

Referring to FIG. 6, in conjunction with FIGS. 1-5, in the embodiment in which the tables T contain multiple classes of tables, pruning engine 202 of relational database management system 102 selects a class of tables with a similarity greater than a threshold value, which may be user-designated, in operation 601.

As discussed above, a "class," as used herein, defines the structure of the tables. Each class may consist of a collection of fields, aggregates, and methods.

In one embodiment, the similarity of a class of tables is computed by similarity engine 201 using the embeddings for the descriptions of the tables in the class of tables.

In one embodiment, similarity engine 201 computes such similarity by obtaining a similarity measure, such as cosine similarity, to determine the similarity between the embeddings. Such a similarity measure is compared to a threshold value, which may be user-designated, to determine if the class of tables should be selected by pruning engine 202. If the similarity measure exceeds such a threshold value, then the class of tables is selected by pruning engine 202. Otherwise, the class of tables is not selected by pruning engine 202.

In operation 602, pruning engine 202 of relational database management system 102 identifies a subset of tables T' from the chosen tables T, including the selected class of tables, based on headers of the tables containing keywords or related keywords in the query. Headers, as used herein, provide the type of information to be found in the columns of the table. For example, headers may include the column names of the table.

As stated above, in one embodiment, pruning engine 202 identifies the subset of tables T' from the chosen tables T based on identifying the headers in tables T that contain all or some of the keywords in the user's query. A "keyword," as used herein, refers to a word or concept of great significance in understanding the user's intent in the query. For example, the user's query may be directed to whether BMI (body mass index) affects the prevalence of heart diseases in humans. In such a query, the words "BMI" and "heart disease" are the significant words in the query to understand the user's intent. In one embodiment, such keywords are identified from a data structure containing a listing of words that are deemed to be keywords. In one embodiment, such a data structure is populated by an expert. In one embodiment, such a data structure (e.g., table) resides within the storage device (e.g., storage device 411, 415) of relational database management system 102.

In one embodiment, pruning engine 202 analyzes such keywords to identify related keywords (e.g., cholesterol, blood pressure) which may also affect the prevalence of heart diseases. Those columns of tables of tables T that contain such related keywords, such as cholesterol, blood pressure, etc., are selected to form the subset of tables T' as discussed further below in connection with FIG. 3.

In one embodiment, such related keywords are identified from a data structure (e.g., table) that contains a listing of related keywords (e.g., cholesterol, blood pressure) to a particular term (e.g., heart disease) used in the user's query. For example, pruning engine 202 may perform a look-up in the data structure for any terms that are related to a term in the query (e.g., heart disease). Upon identifying the term in the query in the data structure, one or more related keywords are identified as being associated with such a term in the query. In one embodiment, such a data structure is populated by an expert. In one embodiment, such a data structure (e.g., table) resides within the storage device (e.g., storage device 411, 415) of relational database management system 102.

Upon identifying such keywords, including the keywords in the query and the related keywords, such keywords are linked with the columns of the tables (the columns of the selected tables of data lakehouse 104, including the selected class of tables of data lakehouse 104). That is, pruning engine 202 identifies the headers in tables T that contain all or some of the keywords or related keywords in the user's query by linking the keywords or related keywords in the user's query (and hence the intent of the user) with the columns of the tables (the columns of the selected tables of data lakehouse 104, including the selected class of tables of data lakehouse 104).

Such linking (referred to as dynamic annotation of columns) is performed using relational graph convolutional networks. A "relational graph convolutional network," as used herein, refers to a type of neural network used for analyzing datasets with complex relationships. In particular, the relational graph convolutional network (RGCN) is designed specifically for modeling relational data. Relational data refers to datasets where the relationships between data points are important, such as knowledge graphs. RGCNs use a graph's structure to learn hidden features about the relationships between nodes and edges, and then use these features to make predictions about the graph.

In one embodiment, RGCNs work by performing multiple rounds of convolution on the graph. In each round, RGCNs use the graph structure to aggregate information from neighboring nodes and edges. This information is then used to update the features of each node in the graph. The process is repeated for several rounds until the RGCN has learned all the relevant features of the graph.

RGCNs can also include a skip connection, which allows the network to preserve previously learned features. That is, the network can use information learned in previous rounds of convolution to improve its predictions in later rounds.

In one embodiment, pruning engine 202 utilizes RGCN to link the headers (e.g., column names) with the keywords or related keywords in the user's query.

In one embodiment, such keywords in a query, including the related keywords (e.g., cholesterol, blood pressure, etc.) are linked to columns (e.g., column names, such as height and weight for body mass index (BMI), APOB (apolipoprotein B-100 test which provides a risk for cardiovascular disease), LDL (low density lipoproteins, which is a type of cholesterol), and VLDL (very low density lipoproteins, which is a type of cholesterol)) of the tables of the selected tables of data lakehouse 104 (e.g., selected class of tables of data lakehouse 104) using the graph structure of the RGCN, which includes concept nodes (associated with keywords and related keywords used in the query), which are mapped to particular columns of the tables of data lakehouse 104. Those mapped columns form the subset of tables T', which includes a reduced number of columns in the tables that will be part of the generated view. A "view," as used herein, refers to a virtual table.

In one embodiment, such a graph structure of the RGCN corresponds to heterogeneous graphs, which offer a unified view of the multimodal data systems by defining multiple types of nodes (for each data type) and edges (for the relation between data items).

By utilizing the RGCN, a subset of tables T' of the selected tables T are identified based on headers containing keywords or related keywords in the query as illustrated in FIG. 3.

Referring to FIG. 3, in the query 301 "I want to generate data to predict heart attack," the term "heart attack" may be identified as being a keyword. Such a keyword may be related to keywords, BMI 302A (body mass index), APOB 302B (apolipoprotein B-100 test which provides a risk for cardiovascular disease), LDL 302C (low density lipoproteins, which is a type of cholesterol), and VLDL 302D (very low density lipoproteins, which is a type of cholesterol) as identified from a data structure as discussed above. Such keywords and related keywords may be associated with concept nodes of the RGCN, which are mapped to particular columns (e.g., columns 303A-303E) of the selected tables T 304 of data lakehouse 104. Such mapped columns are used to identify the subset of tables T' 305 of the selected tables T 304 based on the headers containing the keywords or related keywords in the query.

In operation 603, pruning engine 202 of relational database management system 102 joins the identified subset of tables T' to create a new "view of a dataset" (may be simply referred to as a "view"). A "view of a dataset," as used herein, refers to a virtual table of a collection of data, such as formed from the joined identified subset of tables T'.

As stated above, in one embodiment, such a subset of tables T' are joined based on the primary and secondary keys. A primary key, as used herein, refers to a special relational database table column (or combination of columns) designated to uniquely identify each table record. A secondary key, as used herein, refers to a column or a set of columns in a table that uniquely identifies each row in a table that is not the primary key.

In one embodiment, if there are multiple classes of tables T', then pruning engine 202 selects the class of tables T' which gives rise to the largest sized joined tables.

In operation 604, generating engine 203 of relational database management system 102 generates a description of the new view of the dataset based on the headers and values of the dataset.

As discussed above, in one embodiment, generating engine 203 generates a description of the new view of the dataset based on the headers and values of the dataset using a fine-tuned/prefix-tuned large language model (LLM). A large language model (LLM), as used herein, is a type of artificial intelligence (AI) program that can perform a variety of natural language processing (NLP) tasks using machine learning and deep learning algorithms: recognize, translate, predict, generate, and summarize. Examples of such a LLM can include, but are not limited to, GPT-4®, and Granite®.

Large language model (LLM) fine-tuning is a way to enhance the performance of pretrained LLMs for specific tasks or domains with the aim of achieving improved inference quality with limited resources.

Prefix tuning is a method for training large language models (LLMs) for specific tasks, such as writing, by optimizing a small, task-specific part of the model called the prefix. It is a type of prompt tuning that involves adding a trainable module to each transformer layer of a pre-trained LLM. This module is made up of a sequence of continuous task-specific training vectors. Fine-tuning and prefix-tuning are both methods for adapting pre-trained language models (LLMs) to new tasks, such as outputting the description of the view of the dataset, such as the newly created view of the dataset, based on the headers along with the cell values of the dataset. The "description of the view of the dataset," as used herein, refers to the structure of the dataset to be viewed by the user, such as the column names, constraints on the column names, etc. of the tables of the dataset.

In one embodiment, the input to the LLM corresponds to the headers along with the cell values; whereas, the output of the LLM is the description of the view of the dataset. That is, the headers and cell values are passed into the fine-tuned/prefix-tuned LLM which outputs the description of the view of the dataset.

In one embodiment, the LLM is trained using deep learning techniques. In one embodiment, the LLM is trained to output the description of the view of the dataset based on the headers and cell values of the dataset using a multi-faceted process that involves self-supervised learning, supervised learning, and reinforcement learning. The self-supervised learning phase helps the model to understand language and specific domains. Supervised learning enables the model to follow instructions and generalize to new tasks. Finally, reinforcement learning encourages desirable behaviors.

In one embodiment generating engine 203 trains the LLM to generate a description of the view of the dataset, such as the generated new view of the dataset, based on the header and values of the dataset using various software tools, which can include, but are not limited to, TensorFlow® PyTorch®, NLTK, spaCy®, etc.

In operation 605, similarity engine 201 of relational database management system 102 computes the similarity between the query and the description of the new view of the dataset.

As stated above, in one embodiment, similarity engine 201 computes the similarity between the query and the description of the new view of the dataset by vectorizing the text-based content of the query and the description of the new view of the dataset to create embeddings, such as via Word2vec, Doc2Vec, GloVe, etc.

In one embodiment, similarity engine 201 computes the similarity between the query and the description of new view of the dataset by obtaining a similarity measure, such as cosine similarity, to determine the similarity between the embeddings of the query and the description of the new view of the dataset.

As discussed above, "cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the newly constructed view of the dataset is displayed to the user. Otherwise, a new view is constructed using other subsets of tables T'.

In one embodiment, the similarity measure is a score between the values of 0 and 1 for vectors that have only positive values. In one embodiment, any negative scores can be made positive by taking its absolute value.

Similarity engine 201 utilizes various software tools for generating the similarity score, which can include, but are not limited to, TensorFlow®, Math Works®, plus sklearn, scikit-Learn®, etc.

If operation 606, similarity engine 201 of relational database management system 102 determines if the similarity measure exceeds a threshold value, which may be user-designated, to determine if the newly constructed view of the dataset should be displayed to the user.

If the similarity measure exceeds such a threshold value, then, in operation 607, similarity engine 201 of relational database management system 102 displays the newly constructed view of the dataset to the user, such as the user of computing device 101. In one embodiment, the newly constructed view of the dataset is displayed on the user interface of computing device 101.

In one embodiment, feedback is provided by the user of computing device 101 regarding the displayed constructed view. Based on such feedback (e.g., reject or accept the generated view), the thresholds discussed herein may be appropriately adjusted.

If, however, the similarity measure does not exceed such a threshold value, then pruning engine 202 of relational database management system 102 constructs a new view using other subsets of tables T' based on identifying a new subset of tables of the selected tables in operation 602.

In this manner, an appropriate view of the datasets in the data lakehouse can be provided to the user for the required purpose of the user.

Furthermore, the principles of the present disclosure improve the technology or technical field involving a data lakehouse.

As discussed above, a data lakehouse is a modern data platform built from a combination of a data lake and a data warehouse. More specifically, a data lakehouse takes the flexible storage of structured data from a data lake and the management features and tools from data warehouses, then strategically implements them together as a larger system. The data lakehouse optimizes for the flaws within data warehouses and data lakes to form a better data management system. It provides organizations with fast, low-cost storage for their enterprise data while also delivering enough flexibility to support both data analytics and machine learning workloads. Within a data lakehouse, there are diverse datasets making it difficult for the user to be provided with a view of the data sought by the user. That is, it is not possible for the user to access the right dataset within the data lakehouse, including multiple datasets joined tougher to form a dataset which can be used for the required purpose by the user.

Embodiments of the present disclosure improve such technology by receiving a query for data contained in the data lakehouse. A similarity between the query and a description of each table in the lakehouse is computed. For example, such a similarity calculation is performed based on the similarity between the embedding from the query and the embeddings from the descriptions of the tables in the data lakehouse. Any description of a table with a similarity to the query that is greater than a threshold value results in the table potentially being included in a view to be generated. As a result, such a table is selected to form part of a class of tables. A subset of the selected tables is then identified and joined to create a new view of a dataset. In one embodiment, a subset of the selected tables is identified based on the headers containing the keywords or related keywords of the query. In one embodiment, such identified tables are then joined to create a new view of a dataset. After generating a description of the new view of the dataset based on headers and values of the dataset, such as via a large language model, a similarity between the query and the description of the new view of the dataset is computed. If the similarity measure exceeds a threshold value, then the newly constructed view of the dataset is displayed to the user. In this manner, an appropriate view of the datasets in the data lakehouse can be provided to the user for the required purpose of the user. Furthermore, in this manner, there is an improvement in the technical field involving a data lakehouse.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating a query based view of appropriate datasets in a data lakehouse, the method comprising;

receiving a query for data contained in the data lakehouse;

computing a similarity between the query and a description of each table in the data lakehouse;

selecting one or more tables in the data lakehouse in response to the similarity between the query and the description of the one or more tables exceeding a first threshold value;

identifying a subset of the selected one or more tables using a relational graph convolutional network for linking keywords in the query to columns in the selected one or more tables of the data lakehouse, wherein the relational graph convolutional network performs multiple rounds of convolution on a graph, wherein, in each round, the relational graph convolutional network uses a graph structure to aggregate information from neighboring nodes and edges which is used to update features of each node in the graph;

joining the subset of the selected one or more tables to create a new view of a dataset;

generating a description of the new view of the dataset;

computing a similarity between the query and the description of the new view of the dataset; and displaying the new view of the dataset to a user in response to the similarity between the query and the description of the new view of the dataset exceeding a second threshold value.

2. The method as recited in claim 1 further comprising:

creating an embedding from the query;

creating an embedding for a description of a table for each table in the data lakehouse; and computing a similarity between the query and the description of the table for each table in the data lakehouse using the embedding from the query and the embedding for the description of the table for each table in the data lakehouse.

3. The method as recited in claim 1, wherein the similarity between the query and the descriptions of the tables in the data lakehouse is computed using semantic annotations of the tables in the data lakehouse.

4. The method as recited in claim 1, wherein the relational graph convolutional network comprises concept nodes which are mapped to particular columns of the tables of the data lakehouse, wherein the mapped columns form the subset of the selected one or more tables which includes a reduced number of columns in the tables that will be part of the new view of the dataset.

5. The method as recited in claim 1 further comprising:

selecting a class of tables within the selected one or more tables in the data lakehouse with a similarity greater than a third threshold value.

6. The method as recited in claim 1 further comprising:

identifying the subset of the selected one or more tables based on headers containing keywords or related keywords in the query.

7. The method as recited in claim 1 further comprising:

generating the description of the new view of the dataset based on headers and values of the dataset, wherein the generating of the description of the new view of the dataset is performed using a fine-tuned/prefix-tuned large language model that is trained to output the description based on headers and values of the dataset.

8. A computer program product for generating a query based view of appropriate datasets in a data lakehouse, the computer program product comprising one or more computer readable storage mediums having program code embodied therewith, the program code comprising programming instructions for:

receiving a query for data contained in the data lakehouse;

computing a similarity between the query and a description of each table in the data lakehouse;

selecting one or more tables in the data lakehouse in response to the similarity between the query and the description of the one or more tables exceeding a first threshold value;

identifying a subset of the selected one or more tables using a relational graph convolutional network for linking keywords in the query to columns in the selected one or more tables of the data lakehouse, wherein the relational graph convolutional network performs multiple rounds of convolution on a graph, wherein, in each round, the relational graph convolutional network uses a graph structure to aggregate information from neighboring nodes and edges which is used to update features of each node in the graph;

joining the subset of the selected one or more tables to create a new view of a dataset;

generating a description of the new view of the dataset;

computing a similarity between the query and the description of the new view of the dataset; and displaying the new view of the dataset to a user in response to the similarity between the query and the description of the new view of the dataset exceeding a second threshold value.

9. The computer program product as recited in claim 8, wherein the program code further comprises the programming instructions for:

creating an embedding from the query;

creating an embedding for a description of a table for each table in the data lakehouse; and computing a similarity between the query and the description of the table for each table in the data lakehouse using the embedding from the query and the embedding for the description of the table for each table in the data lakehouse.

10. The computer program product as recited in claim 8, wherein the similarity between the query and the descriptions of the tables in the data lakehouse is computed using semantic annotations of the tables in the data lakehouse.

11. The computer program product as recited in claim 8, wherein the relational graph convolutional network comprises concept nodes which are mapped to particular columns of the tables of the data lakehouse, wherein the mapped columns form the subset of the selected one or more tables which includes a reduced number of columns in the tables that will be part of the new view of the dataset.

12. The computer program product as recited in claim 8, wherein the program code further comprises the programming instructions for:

selecting a class of tables within the selected one or more tables in the data lakehouse with a similarity greater than a third threshold value.

13. The computer program product as recited in claim 8, wherein the program code further comprises the programming instructions for:

identifying the subset of the selected one or more tables based on headers containing keywords or related keywords in the query.

14. The computer program product as recited in claim 8, wherein the program code further comprises the programming instructions for:

generating the description of the new view of the dataset based on headers and values of the dataset, wherein the generating of the description of the new view of the dataset is performed using a fine-tuned/prefix-tuned large language model that is trained to output the description based on headers and values of the dataset.

15. A system, comprising:

a memory for storing a computer program for generating a query based view of appropriate datasets in a data lakehouse; and a processor connected to the memory, wherein the processor is configured to execute program instructions of the computer program comprising:

receiving a query for data contained in the data lakehouse;

computing a similarity between the query and a description of each table in the data lakehouse;

selecting one or more tables in the data lakehouse in response to the similarity between the query and the description of the one or more tables exceeding a first threshold value;

identifying a subset of the selected one or more tables using a relational graph convolutional network for linking keywords in the query to columns in the selected one or more tables of the data lakehouse, wherein the relational graph convolutional network performs multiple rounds of convolution on a graph, wherein, in each round, the relational graph convolutional network uses a graph structure to aggregate information from neighboring nodes and edges which is used to update features of each node in the graph;

joining the subset of the selected one or more tables to create a new view of a dataset;

generating a description of the new view of the dataset;

computing a similarity between the query and the description of the new view of the dataset; and displaying the new view of the dataset to a user in response to the similarity between the query and the description of the new view of the dataset exceeding a second threshold value.

16. The system as recited in claim 15, wherein the program instructions of the computer program further comprise:

creating an embedding from the query;

creating an embedding for a description of a table for each table in the data lakehouse; and computing a similarity between the query and the description of the table for each table in the data lakehouse using the embedding from the query and the embedding for the description of the table for each table in the data lakehouse.

17. The system as recited in claim 15, wherein the similarity between the query and the descriptions of the tables in the data lakehouse is computed using semantic annotations of the tables in the data lakehouse.

18. The system as recited in claim 15, wherein the relational graph convolutional network comprises concept nodes which are mapped to particular columns of the tables of the data lakehouse, wherein the mapped columns form the subset of the selected one or more tables which includes a reduced number of columns in the tables that will be part of the new view of the dataset.

19. The system as recited in claim 15, wherein the program instructions of the computer program further comprise:

selecting a class of tables within the selected one or more tables in the data lakehouse with a similarity greater than a third threshold value.

20. The system as recited in claim 15, wherein the program instructions of the computer program further comprise:

identifying the subset of the selected one or more tables based on headers containing keywords or related keywords in the query.

\* \* \* \* \*